Aug. 28, 1962  W. WITT  3,051,003
MEASURING APPARATUS
Filed Nov. 21, 1958
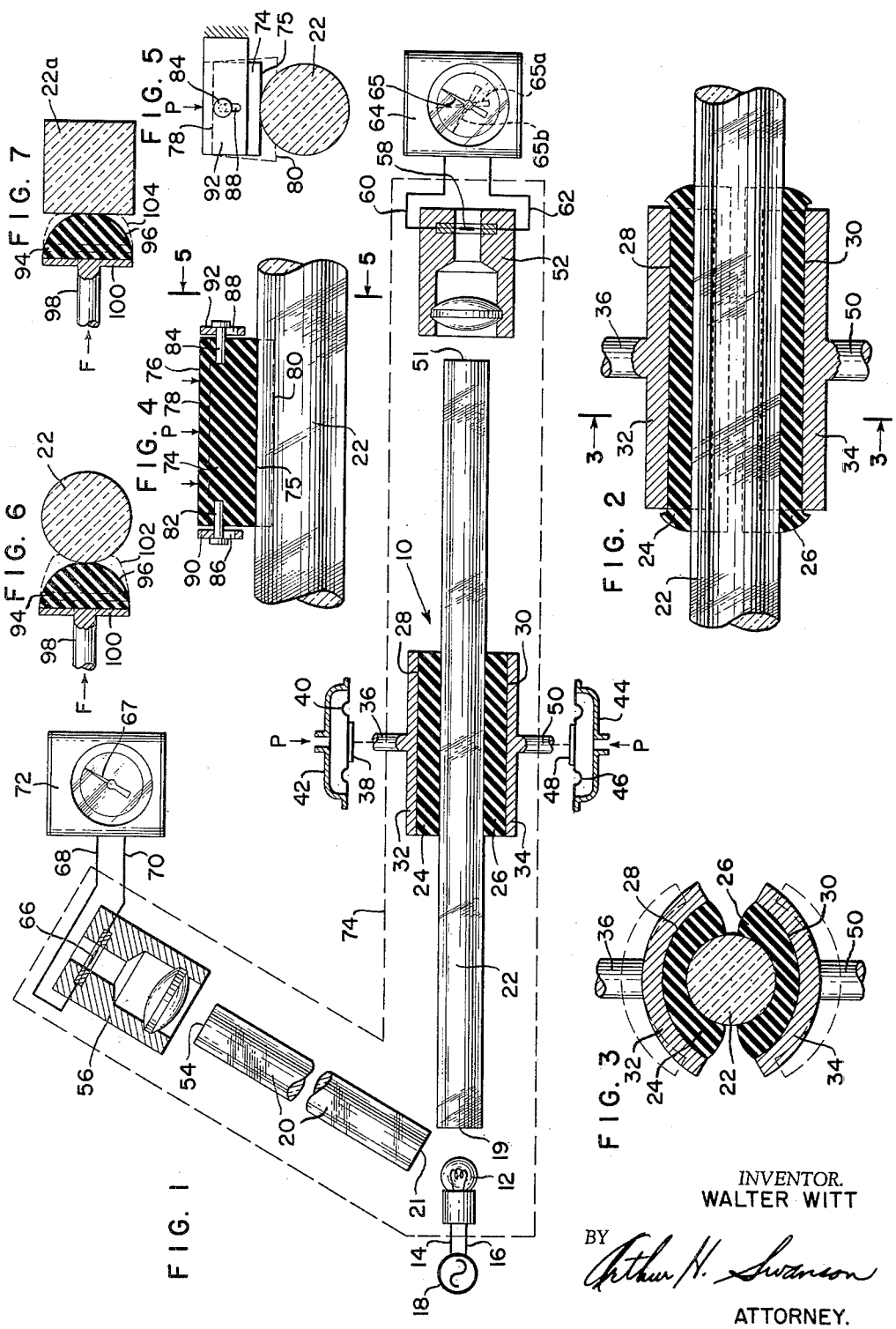
INVENTOR.
WALTER WITT
BY *Arthur H. Swanson*
ATTORNEY.

United States Patent Office 3,051,003
Patented Aug. 28, 1962

3,051,003
MEASURING APPARATUS
Walter Witt, Philadelphia, Pa., assignor to Minneapolis-Honeywell Regulator Company, Minneapolis, Minn., a corporation of Delaware
Filed Nov. 21, 1958, Ser. No. 775,483
11 Claims. (Cl. 73—388)

This application relates to a radiant energy measuring apparatus for transforming the magnitude of the fluid pressure signal and/or a varying force into a measurable electric quantity whose value is proportional to this signal or force.

Another more specific object of the present invention is to provide an apparatus of the aforementioned type wherein a pressure signal or varying force is applied to a resilient member to alter the area of contact which the member makes with a radiant energy transmitting guide in order to change the transmission characteristics of this guide in accordance with changes occurring in the magnitude of the pressure signal or force.

It is another object of the present invention to provide an apparatus in which this pressure signal or varying force is applied to two resilient members which are in contact with opposite peripheral side wall portions of a radiant energy transmitting guide so that a measurable loss or gain in the quantity of radiant energy will be produced that is proportional to the magnitude of the pressure signal or force.

Still another object of the invention is to provide an indicating apparatus of the aforementioned type that will accurately measure very minute changes that occur in the magnitude of a pressure signal or force.

This application along with the copending U.S. patent application of Vollmer et al., Serial No. 753,570, which is assigned to the same assignee, each make use of an apparatus which measures the index of refraction and/or absorption characteristics of a substance surrounding a radiant energy guide or rod member. Although this application relies on the aforementioned referred to application of James Vollmer et al. to clearly assert the principles upon which measurements of these substances may be acquired, this present application differs from that of the Vollmer et al. application in that it discloses a characterized radiant energy rod arrangement which is particularly adapted to measure the magnitude of a pressure signal or force as will hereinafter be described. The Vollmer et al. application on the other hand discloses a radiant energy guide which is particularly adapted to measure the specific gravity and/or composition of a fluid.

A still more specific object of the present invention is thus to provide an apparatus having a resilient member which is retained in a compressed or expanded position against a radiant energy transmitting guide by a fluid pressure or force applied thereto so that a slight change in the magnitude of this pressure or force may be detected by measuring the effect that this resilient member has on the transmission characteristics of the guide.

A better understanding of the present invention may be had from the following detailed description when read in connection with the accompanying drawing, in which:

FIG. 1 is a front sectional view of a measuring apparatus showing a resilient member, which is in a fully expanded or loose condition, positioned against a light guide;

FIG. 2 shows a front elevation of an elongated portion of the resilient member of FIG. 1 which is shown positioned in a compressed condition against a light guide;

FIG. 3 shows a sectional end elevation of the resilient members taken along the lines 3—3 of FIG. 2 in which the solid line positions of these members are representative of the compressed condition of a resilient member as shown in FIG. 2 and the dotted line position of these resilient members represents the position these members are in when they are in a fully expanded condition;

FIG. 4 shows a modified form of a resilient member and light guide which could be used in lieu of the resilient member and light guide arrangement shown in FIGS. 1 and 2;

FIG. 5 shows an end elevation taken along the line 5—5 of FIG. 4;

FIG. 6 shows still another cross sectional end elevation view of a modified form of a resilient member being used with an elongated light guide which is of a cylindrical cross section and FIG. 7 shows a cross sectional end elevation of a form of a resilient member that is identical to that shown in FIG. 6 but which is shown being used with a light guide which has a square cross section.

Before describing the present invention, the principle of operation will be described.

It has been discovered that when light is transmitted by a highly refractive rod such as, for instance, an artificial sapphire rod, the amount of light which will pass all the way through the rod from one end to the other is dependent upon the index of refraction of the surrounding medium. With the index of refraction of the rod relatively high such as would be true with an artificial sapphire rod and the index of refraction of the surrounding medium relatively low such as would be true if the surrounding medium were a gas, substantially all the light entering one end of the rod will pass out of the other end due to the large angle of total reflection resulting from the entire light transmitting system. Applying this principle it can be seen that when a reduction in surface area of a guide rod that is in contact with a solid material such as rubber or a plastic material occurs a large amount of light will pass out of the guide rod. However, if a larger surface area of the guide rod is brought into contact with this resilient member then the quantity of light which will then pass out of the guide rod will be reduced. More specifically, if the effect of a fluid pressure or force is applied to this solid resilient member it will cause the member to be compressed against a greater peripheral surface area of the guide and thus provide a greater area into which a larger portion of the radiant energy that is then passing through the guide can be absorbed then was possible before this pressure or force was present. It is this principle on which the present apparatus operates.

In FIG. 1 of the drawing there is shown a fluid pressure measuring apparatus which is generally designated as reference numeral 10. This apparatus has an electromagnetic energy source which is schematically indicated as a light source 12 which derives its electrical energy by way of the conductors 14, 16 from a power source 18. This light source 12 is positioned so that it is in alignment with the end 19 of radiant energy guide 22. A stationary reference radiant energy transmitting guide 20 is also shown having one of its ends 21 in alignment with this light source 12 in the same manner in which the end 19 of a stationary radiant energy transmitting guide 22 is aligned with this light source.

Although each of these radiant energy transmitting guides 20, 22 are preferably of a rod-shaped configuration and are made of a transparent material such as sapphire, it should be understood that guides which are made of quartz, Pyrex, or of acrlyn resin or methyl methacrylate plastic materials of the thermoplastic type such as, for example, commercially available materials sold under the trademark of Plexiglas or Lucite, may also be used.

Located along the length of the guide 22 and surrounding this guide there is shown a resilient member comprised of the upper and lower portions 24, 26. The inner peripheral surface of these upper and lower portions 24, 26 are shown in there fully expanded loose or dotted line positions with respect to the guide 22 shown in FIG. 3. The inner surface of these resilient portions 24, 26 are shown in their fully compressed or solid line positions in FIG. 2 and FIG. 3.

The outer peripheral surface of these resilient portions 24, 26 are shown fixedly connected along their surfaces 28, 30 by way of any suitably commercially available cementing material to the inner respective peripheral surfaces of the retaining members 32, 34.

Protruding upperwardly from the center of the retaining member 32 there is shown a rod 36 that has its upper end connected to a center portion 38 of a diaphragm 40 on the other side of which a fluid signal P that is within the chamber 42 is being applied.

In a similar but opposite manner a fluid pressure signal P is also shown being applied within the chamber 44 to a diaphram 46 that has a center portion 48 connected to the rod 50 of the retaining member 34.

An opposite end 51 of the guide 22 is directly in front and spaced slightly to the left of the thermopile 52 and the end 54 of the guide 20 is shown located in a similar manner with respect to the thermopile 56. Specifically each of the thermopiles illustrated in FIG. 1 is basically a thermopile of the type which is disclosed and claimed in the Harrison et al. Patent No. 2,357,193 and which is in extensive commercial use in radiation pyrometers manufactured and sold by applicant's assignee. The light sensing element 58 of the thermopile 52 is connected by way of conductors 60, 62 to a volt meter 64 having an indicating pointer 65 and a light sensing element 66 of the thermopile 56 is also shown connected by way of conductors 68, 70 to a volt meter 72 having an indicating pointer 67.

FIG. 1 of the drawing schematically shows an enclosure 74 entirely encompassing most of the component parts of the measuring apparatus so far described so that stray light or any foreign matter from any external source will be prevented from coming in contact with, for example, any unprotected peripheral wall portion of either the radiant energy transmitting guide 20 or the guide 22.

FIGS. 4 and 5 show a modified form of the invention in which a single resilient member 74 can be employed in place of the dual resilient member arrangement 24, 26 shown in FIGS. 1–3. As can best be seen in FIG. 5, the lower solid line surface 75 of this member 74 illustrates a non-expanded position or the position which member 74 will take when no pressure P is being applied to its upper surface 76.

The dotted line 78, 80 illustrates a position that this single resilient member 74 will be in when a pressure P is applied to its upper surface 76. The single resilient member 74 is shown supported on its outer ends by means of pins 82, 84 that respectively ride freely in a vertical direction in the slots 86, 88 of the stationary support members 90, 92.

FIGS. 6 and 7 show still other modified forms of the invention in which another type of single resilient member 94 is employed. The solid line surfaces 96 of each of these resilient members 94 are illustrative of a non-compressed position or a position in which no force F is being applied to the left end of the piston rod 98. The surface of the right end portion 100 of this piston is shown having the aforementioned resilient member 94 retained therein by, for example, any suitable commercially available cementing material.

The dotted line positions 102, 104 illustrates a position that the single resilient member 94 will be in when the force F is applied to the left end of the piston rod 98.

In operation, the electric bulb 12 is energized to emit radiant energy that will pass through and out of the ends 54, 51 of the transmitting guide 20, 22. The pressure signal P being applied to chambers 42, 44 which is to be measured is applied against diaphragms 40, 46 which in turn will cause the rods 36, 50 and the retaining plates 32, 34 to compress the resilient member 24, 26 from the dotted line to the solid line position against the guide 22 such as is illustrated in FIG. 3. The thermopiles 52, 56 will measure the amount of light existing the ends 50, 54 respectively and these measured amounts of light will be recorded by the volt meters 64, 72. By comparing the difference in the indicator pointer readings 65a and 67 of the meters 64, 72, a measurement will be obtained which will represent the amount of light that was lost through the guide 22 to the compressed resilient member or in other words the magnitude of the pressure P. It can thus be seen that when the resilient members 24, 26, having an index of refraction different from that of the air in the atmosphere, are brought into contact with the guide the critical angle existing between the guide and these members will be altered and the amount of light that will then refract out of the guide into the resilient members as lost transmitted light will thus be increased over that amount of light which was lost in this refracted manner when the entire outer peripheral portion of the guide was in contact with the atmosphere which surrounded this guide. If the magnitude of the pressure P is then increased the pointer 65 will take the 65b position shown. The aforementioned light loss, or value of this increased pressure, will be the difference that exists between the indicator pointer 65b and 67. It can thus be seen that this latter mentioned increased pressure causes a greater percentage of the surface of the guide to be contacted by the resilient members 24, 26 which, prior to the application of this increased pressure was in contact with a medium which had a different index of refraction than the material of these resilient members, namely, the air of the atmosphere which surrounds this guide. Because a change in the index of refraction of the material in contact with the guide under this increased pressure condition now takes place over a greater surface of the guide, the area over which the new critical angle that exists between the guide and the resilient members 24, 26 also increases. Therefore, a greater amount of light will be permitted to be refracted into the guide than was possible under the first-mentioned pressure condition in which the resilient members 24, 26 contacted a smaller peripheral surface of this guide.

In a similar manner it can be seen that a force F in lieu of the aforementioned pressure signal P could readily be applied to a resilient member which is in contact with the guide 22 such as is illustrated in the FIG. 6 form of the invention so that a reading of the magnitude of a force F rather than a pressure signal P can be obtained.

It should also be understood that certain modified forms of the invention may be combined with other modified forms so that a combined instantaneous measurement of a fluid pressure signal and a varying force may be acquired. This can be accomplished for example by replacing the pressure actuating parts 26, 34, 44–50 shown in FIG. 1 with the force actuating parts 94–102 shown in FIG. 6 of the drawing.

From the aforementioned description of the measuring apparatus shown in the various figures of the drawing it can be seen that an apparatus is disclosed that is useful in converting a pressure signal and/or force into an electric quantity that is proportional to either of these converted quantities. To accomplish this feat the pressure signal and/or force to be measured is applied to a resilient mem-

What is claimed is:

1. An apparatus to continuously measure changes taking place in the magnitude of a fluid pressure, comprising a radiant energy emitting means, two elongated radiant energy conducting members each having a first and second end and a peripheral side wall, said first ends being positioned substantially equidistant from said radiant energy emitting means, the radiant energy emitting means being operable to direct bands of radiant energy through and out of each of said members, a resilient means having a portion of one of its surfaces in contact with a portion of a peripheral side wall of one of said members, the area of physical contact which the contacting surface of said resilient means makes with said side wall being increased or decreased as said magnitude of said fluid pressure being applied to said resilient means is increased or decreased, a means to indicate increases or decreases in the quantity of radiant energy passing out of said one of said members due to variations in the area of contact between said resilient means and the side wall of said one member as said magnitude of said fluid pressure is altered from one magnitude of said fluid pressure to another, and a second reference radiant energy indicating means to indicate the quantity of radiant energy that is passing out of the other of said members.

2. The fluid pressure measuring apparatus as specified in claim 1 wherein said radiant energy conducting members are sapphire rods and said resilient means is comprised of two spaced apart segments which are of an arcuate configuration.

3. The fluid pressure measuring apparatus specified in claim 1 in which the said radiant energy conducting members are sapphire rods and the cross section of said resilient means is of a semicircular configuration.

4. An apparatus to measure the magnitude of a fluid pressure in terms of its electromagnetic radiant energy absorption characteristics, comprising means to emit radiant energy, two identical elongated electromagnetic radiant energy conducting members each having a first and second end portion, the means to emit radiant energy being positioned substantially equidistant from said first end portions to transmit its emitted radiant energy against said first end portions and into each of said conducting members, a resilient member, means actuated by said fluid pressure to retain said resilient member in a partially compressed relationship and in physical contact with a peripheral portion of one of said conducting members, a separate radiant energy sensing means positioned to continuously and instantaneously sense the resulting radiant energy that passes through the second end portion of each conducting member and a separate indicating instrument operably connected to each one of said sensing means to thereby provide simultaneous comparative individual differences in the amount of energy being sensed by each of said sensing means as increases or decreases in the magnitude of a fluid pressure acting on said resilient member causes said resilient member to change the physical area of contact that said resilient member makes with said conducting member.

5. The apparatus as specified in claim 4 wherein said radiant energy conducting members are elongated sapphire rods and said resilient member is comprised of two plastic members of an arcuate-shaped configuration.

6. An apparatus to measure the magnitude of a force, comprising two matched electromagnetic radiant energy conducting members, each of said members having a first and second end portion and a peripheral side wall therebetween, a radiant energy source positioned substantially equidistant from each of said first end portions to emit bands of radiant energy through each of said first end portions and into each member, a force actuated means to retain a resilient means in a physical partially compressed contact with a portion of said wall of one of said radiant energy conducting members, a separate radiant energy sensing means juxtapositioned with respect to each of said second end portions to measure the energy emitted therefrom and a separate radiant energy responsive means operably connected to each sensing means to measure the amount of radiant energy sensed by each of said sensing means as the magnitude of a force applied to said force actuated means is increased or decreased and the resulting area of physical contact which said resilient member makes with the one of said radiant energy conducting members is correspondingly increased or decreased.

7. The measuring apparatus as specified in claim 6 wherein said resilient means is of a rubber material and said radiant energy conducting members are sapphire.

8. An apparatus for measuring continuously the magnitude of a fluid pressure, comprising a first sapphire rod having a peripheral surface and two end surfaces, a second sapphire rod substantially identical to said first rod, said first rod being adapted to have a portion of its peripheral surface in partial physical surface to surface relationship with a resilient member, a source of radiant energy positioned adjacent one end of each of said rods to direct equal amounts of radiant energy therethrough, a separate first and second radiant energy responsive means disposed adjacent the respective other ends of said first and second rods to respectively respond to the radiant energy emitted therefrom and a separate means operably connected to each of said responsive means for continuously indicating individually responses of said first and second radiant energy responsive means as the magnitude of the fluid pressure acting on said resilient member is changed and the area of physical contact existing between said resilient member and said first rod is thereby altered.

9. An apparatus for measuring continuously the magnitude of a fluid pressure, comprising a first sapphire rod having a peripheral surface and two end surfaces, a second sapphire rod substantially identical to said first rod, said first rod being adapted to have a portion of its peripheral surface in partial physical surface to surface relationship with a resilient member, an electric light source disposed so as to direct equal amounts of radiant energy into one end of each of said first and second rods, first and second thermopiles disposed adjacent the respective other end of said first and second rods to respectively respond to the radiant energy emitting from said other ends of their associated rods and separate means for continuously indicating individual responses of said first and second thermopiles as the magnitude of a fluid pressure acting on said resilient member is changed to alter the area of physical contact existing between said resilient member and said rod.

10. A fluid pressure to electrical signal converting apparatus, comprising an elongated first and second radiant energy transmitting means each having first and second end portions, a radiant energy source to direct the same characterized amount of radiant energy through each of said first ends, a resilient means having a portion of one of its surfaces in contact with the outer peripheral side wall surface of said first transmitting means, a fluid pressure source of varying magnitude, a movable member connected to said fluid pressure source and said resilient means for applying a different magnitude of force to said resilient means to press a different size of the contacting surface portion of the one surface of said resilient means against the side wall of the first radiant energy transmitting means as changes in the magnitude of the fluid pressure occur, and separate electrical radiant energy measuring means positioned at an opposite second end portion of said first and second transmitting means to indicate changes in the intensity of the radiant energy passing through the respective second end portions of each radiant energy transmitting member.

11. The converting apparatus defined in claim 10 wherein said resilient means is of a rubber material and each of said transmitting means are sapphire rods.

References Cited in the file of this patent

UNITED STATES PATENTS

| | | |
|---|---|---|
| 2,415,436 | Maris | Feb. 11, 1947 |
| 2,984,148 | Vollmer | May 16, 1961 |

FOREIGN PATENTS

| | | |
|---|---|---|
| 596,152 | Great Britain | Dec. 30, 1947 |